United States Patent [19]
Kroeker et al.

[11] Patent Number: 6,073,232
[45] Date of Patent: *Jun. 6, 2000

[54] METHOD FOR MINIMIZING A COMPUTER'S INITIAL PROGRAM LOAD TIME AFTER A SYSTEM RESET OR A POWER-ON USING NON-VOLATILE STORAGE

[75] Inventors: Richard Mark Kroeker, Morgan Hill; Richard Henry Mandel, III, San Jose, both of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/806,135

[22] Filed: Feb. 25, 1997

[51] Int. Cl.⁷ ..................................................... G06F 9/445
[52] U.S. Cl. ................................. 713/1; 713/2; 713/100
[58] Field of Search ..................................... 395/651, 652, 395/653; 713/1, 2, 100

[56] References Cited

U.S. PATENT DOCUMENTS

| | | |
|---|---|---|
| 4,663,707 | 5/1987 | Dawson .................................. 364/200 |
| 5,210,875 | 5/1993 | Bealkowski et al. .................... 395/700 |
| 5,230,052 | 7/1993 | Dayan et al. ............................ 395/700 |
| 5,269,022 | 12/1993 | Shinjo et al. ............................. 395/700 |
| 5,307,497 | 4/1994 | Feigenbaum et al. ................... 395/700 |
| 5,325,532 | 6/1994 | Crosswy et al. ......................... 395/700 |
| 5,355,498 | 10/1994 | Provinp et al. .......................... 395/700 |
| 5,404,527 | 4/1995 | Irwin et al. ............................... 395/700 |
| 5,410,699 | 4/1995 | Bealkowski et al. .................... 395/700 |

*Primary Examiner*—Ayaz R. Sheikh
*Assistant Examiner*—Tim Vo
*Attorney, Agent, or Firm*—Gray Cary Ware Freidenrich

[57] ABSTRACT

A method for increasing boot speed of a host computer with associated hard disk drive generates a prefetch table that contains pointers to disk locations and lengths of the records of an application program requested by the host computer during an initial power-on/reset. During the next power-on/reset, before the host computer is ready for data but after the disk drive has completed its reset routine, using the prefetch table the disk drive accesses the previously requested data and copies it onto the cache of the disk drive, from where it is transferred to the host computer when the host computer requests it. The prefetch table is updated to reflect disk location changes for the various records, or to reflect new records that were requested by the host computer but not found in cache during the previous power-on/reset.

33 Claims, 2 Drawing Sheets

METHOD FOR MINIMIZING A COMPUTER'S INITIAL PROGRAM LOAD TIME AFTER A SYSTEM RESET OR A POWER-ON USING NON-VOLATILE STORAGE

BACKGROUND OF THE INVENTION

1. Field of the Invention

The present invention relates generally to peripheral storage apparatus for computers, and more particularly to shortening the load time of computer programs from a hard disk drive to a host computer.

2. Description of the Related Art

When a computer undergoes a hardware reset (i.e., a power-on or reset), the computer executes procedures embodied in its power-on/reset firmware which prepare for loading an operating system into the computer to condition it for operation. Typically, execution of such procedures begins what is referred to as a "boot". While the computer is executing these power on/reset procedures, peripheral devices that are associated with the computer, such as, for example, a hard disk drive, also execute their own power-on/reset procedures embodied in firmware. When the computer finishes the above-described firmware-implemented portion of the "booting" process, it typically requests data from the disk drive as part of initializing user-selected software, e.g., a program marketed under one of the tradenames DOS, Windows, UNIX, OS/2, AIX, etc.

It happens that the transfer of the selected program to the computer is relatively slow, particularly when the program is a modern large operating system. Accordingly, methods have been disclosed for increasing the speed with which computers "boot". One example of such a method is disclosed in U.S. Pat. No. 5,307,497, which teaches that a portion of an operating system can be stored in read-only memory (ROM) for fast access of the portion during power-on or reset. Unfortunately, the portion stored in ROM is unchangeable. In other words, the method disclosed in the '497 patent does not adapt to changing user preferences regarding operating systems, or indeed to updated versions of a particular operating system.

Another example of a previous attempt to shorten the load time from a disk drive to its host computer is set forth in U.S. Pat. No. 5,269,022. As disclosed in the '022 patent, a snapshot of computer memory is stored in a backup memory that is separate from the disk drive associated with the computer, for use during the next succeeding boot. Unfortunately, the backup memory must be large, because it must store the entire computer memory. Also, the method disclosed in the '022 patent requires operating system intervention, which, because of security features common to many modern operating systems, renders the '022 invention unfeasible.

As recognized by the present invention, however, it is possible to provide, without operating system intervention, a method for adaptively preparing a disk drive to effect rapid application program loading to a host computer. Specifically, we have found that during hardware resets the disk drive associated with a host computer typically completes its booting process before the host computer is ready for program transfer, and as recognized by the present invention, the disk drive can be configured during this period for rapidly communicating a program to the host computer.

Accordingly, it is an object of the present invention to provide a method for rapidly communicating a computer program from a disk drive to a host computer.

Another object of the present invention is to provide a method for rapidly communicating a computer program from a disk drive to a host computer which adapts to changes in user program preference, and to changes in program storage location on the disks of the disk drive. Yet another object of the present invention is to provide a method for rapidly communicating a computer program from a disk drive to a host computer which does not require excessively large storage space, and which can be undertaken entirely by the disk drive itself, transparent to the host computer. Still another object of the present invention is to provide a method for rapidly communicating a computer program from a disk drive to a host computer which is easy to use and cost-effective.

SUMMARY OF THE INVENTION

The invention is embodied in an article of manufacture—a machine component—that is used by a digital processing apparatus and that tangibly embodies a program of instructions that are executable by the digital processing apparatus to rapidly communicate a computer program from a hard disk drive to the drive's host computer.

This invention is realized in a critical machine component that causes a digital processing apparatus to adaptively store a computer program on the cache of the hard disk drive and communicate the program to the host computer. Hereinafter, the machine component is referred to as a "computer program product".

In accordance with the present invention, steps executed by the digital processing apparatus include, after an initial power-up or reset of the hard disk drive and a host computer associated with the drive, receiving an initial read command from the host computer for transferring to the host computer a plurality of data records of a program stored on the disk. A prefetch table is then generated, with the table representing a disk location and length of each data record requested by the initial read command. Then, after a subsequent power-on or reset of the hard disk drive, and during a second power-on or reset of the host computer, the prefetch table is accessed to read into the data cache the data records. In response to a subsequent read command from the host computer, it is determined whether records requested by the subsequent read command are stored in the data cache. If they are, the records are communicated from the cache to the host computer; otherwise, the records are communicated from the disk to the host computer.

Preferably, the accessing and determining steps are repeated for each power-on or reset of the host computer. The steps executed by the digital processing apparatus further include either incrementing a read counter toward a predetermined value, fixed in the algorithm or programmed by the user or adaptively determined based on system environmental conditions, or decrementing a counter towards zero using the same process described for the incrementing condition when it is determined during the determining step that records requested by the subsequent read command are not stored in the data cache. As used generally herein, then, "incrementing" a counter refers both to incrementing and decrementing a counter. Additionally, the steps further include updating the data prefetch table, communicating the records from the disk to the host computer when the read counter exceeds a predetermined threshold, and setting a prefetch flag to inactive when the read counter exceeds the predetermined threshold.

In the presently preferred embodiment, the invention also includes setting the prefetch flag to inactive when a predetermined number of write commands from the host computer to the hard disk drive have been received. Moreover, the invention can include, after the communicating step and when the prefetch flag is inactive, determining whether the hard disk drive is idle and if so, storing the prefetch table on the disk. The computer program product is disclosed in combination with the hard disk drive, and in combination with the host computer.

In another aspect, a computer program product is disclosed for use with a host computer that is coupled to a hard disk drive. The hard disk drive includes at least one storage disk having a program stored thereon and a data cache, and the computer program product includes a data storage device which includes a computer usable medium having computer readable program means. As disclosed in detail below, these code means are for enhanced loading of the program from the hard disk drive to the host computer during power-on or reset of the host computer. In accordance with the present invention, code means receive a command from the host computer during a power-up or reset of the host computer. When the command is a read command, code means generate a prefetch table representative of at least the disk location of the records requested by the read command for transfer of the records from the disk to the cache for a subsequent power-on or reset of the host computer. Moreover, code means are provided for determining whether the records have been stored in the cache in response to a previous power-on or reset of the host computer, and the records are communicated to the host computer in response.

In still another aspect, a computer hard disk drive includes at least one data storage disk and a data storage cache. Furthermore, the hard disk drive includes means for recording onto the cache, immediately after a hardware reset of the hard disk drive, data on the disk that has been requested by a host computer during a first hardware reset of the host computer. Additionally, the disk drive includes means for communicating the data from the cache to the host computer during a second hardware reset of the host computer.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
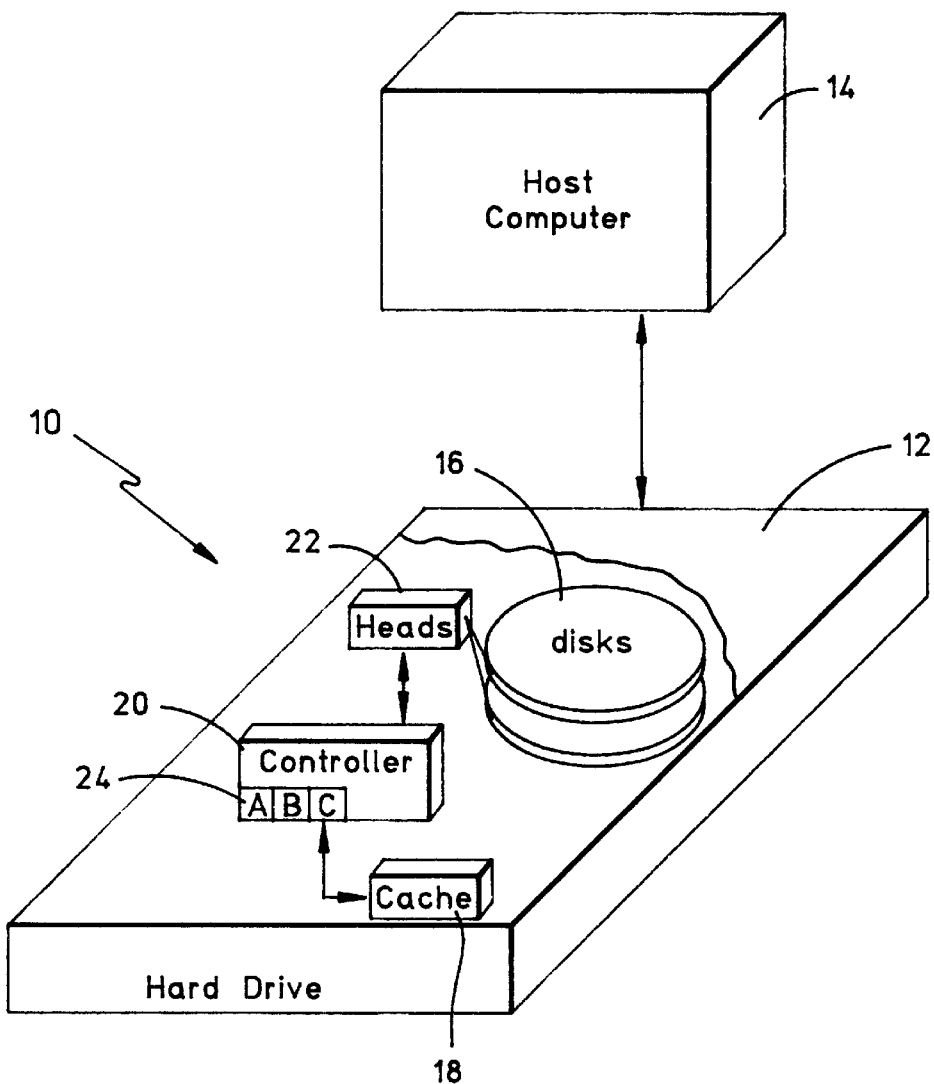
FIG. 1 is a partially schematic view of a disk drive with associated host computer, with portions broken away for clarity.

Referring initially to FIG. 1, a system is shown, generally designated 10, for promoting rapid communication of a computer program from a hard disk drive 12 to a host computer 14 that is in data communication with the disk drive 12 in accordance with principles well-known in the art. In one intended embodiment, the host computer 14 may be a personal computer (PC) or laptop computer made by IBM Corp. of Armonk, N.Y. Or, the host computer 14 may be a Unix computer, or OS/2 server, or Windows NT server, or IBM RS/6000 250 workstation. Indeed, the host computer 14 can be an embedded controller that is part of a music synthesizer, or part of an industrial instrument. And, the hard disk drive 12 can be any hard disk drive suitable for computer applications, provided that the hard disk drive 12 includes at least one, and typically a plurality of, data storage disks 16 and an on-board, solid state, random access memory (RAM) data cache 18.

As shown in FIG. 1, the hard disk drive 12 also includes an onboard controller 20. In accordance with principles well-known in the art, the onboard controller 20 is a digital processor which, among other things, controls read heads 22 in the disk drive 12 for effecting data transfer to and from the disks 16.

Additionally, as intended by the present invention the onboard controller 20 includes an adaptive cache module 24. Per the present invention, the adaptive cache module 24 is executed by the onboard controller 20 as a series of computer-executable instructions. These instructions are embodied as microcode in a memory, e.g., read-only memory (ROM) of the onboard controller 20. Such a ROM is indicated by reference numeral 21 in FIG. 2. The ROM 21 contains microinstructions that embody means and program steps that perform according to the invention. When in the ROM 21, the microinstructions become part of the ROM 21, and therefore, part of the hardware of the disk drive 12.

Those skilled in the art will appreciate that the hard disk drive is merely illustrative of a particular tangible environment that is useful for understanding the concepts of our invention. Broadly, the hard disk drive 12 represents a peripheral storage apparatus. The hard disks 16 of the hard disk drive 12 represent data storage elements that are found in the general peripheral storage apparatus. The invention, therefore, applies to such a peripheral storage apparatus and a data storage element, and should not be limited to a hard disk drive.

Figure 2:
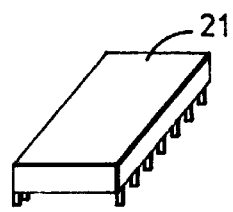
FIG. 2 is an illustration of memory such as read-only memory (ROM), random access memory (RAM), electrically-erasable programmable read only memory (EEPROM), or dynamic random access memory (DRAM) containing microcode, that embodies the invention as a program storage product.
Figure 3:
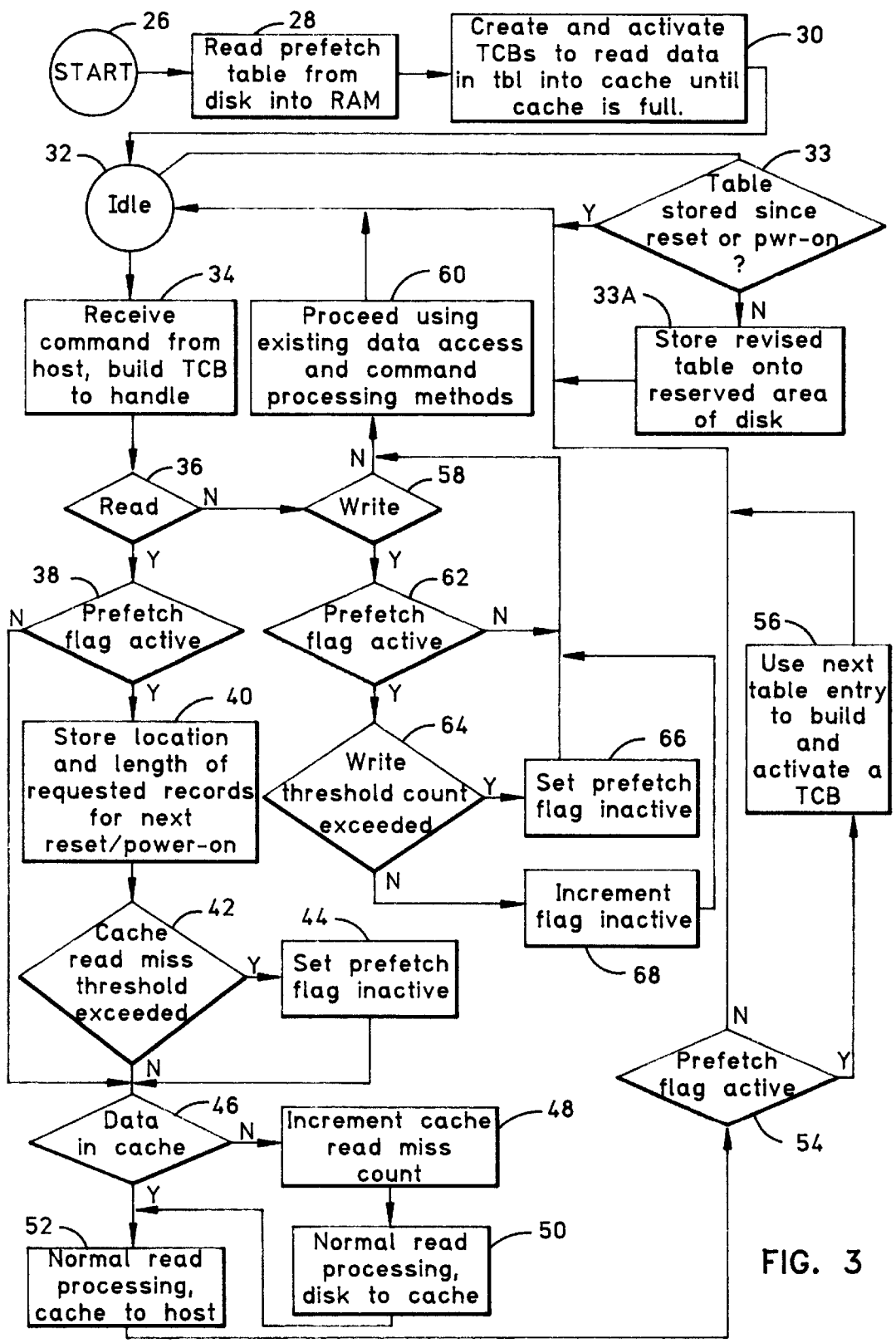
FIG. 3 is a flow chart showing the method steps of the present invention.

FIG. 3 illustrates the structure of such microinstructions as embodied in a computer program. Those skilled in the art will appreciate that FIG. 3 illustrates the structures of computer program code elements that function according to this invention. Manifestly, the invention may be practiced in its essential embodiment by a machine component, embodied by the ROM 21, that renders the computer program code elements in a form that instructs a digital processing apparatus (e.g., the onboard controller 20) to perform a sequence of function steps corresponding to those shown in the Figures. The machine component is shown in FIGS. 1 and 2 as a combination of program code elements A–C in computer readable form that are embodied in a computer-usable data medium (the ROM 21) of the onboard controller 20. Such media can also be found in other semiconductor devices, on magnetic tape, on optical disks, on floppy diskettes, on a DASD array, on a conventional hard disk drive, in logic circuits, in other data storage devices, or even in a node of a network. In an illustrative embodiment of the invention, the computer-executable instructions would be in object code form, compiled or assembled from a C++ language program and stored, by conventional means, in the ROM 21. Or, the code used can be an interpretative code such as Forth, Smalltalk, or Java and its derivatives.

Referring in detail to FIG. 3, the method of the present invention can be seen. It is to be understood that in the presently preferred embodiment, the method begins immediately after the hard disk drive 12 has completed its power-on/reset (i.e., hardware reset) routine.

Commencing at start state 26, the process moves to block 28, wherein a prefetch table is read from a reserved area of the disks 16 into the RAM cache 18. As discussed further below, the prefetch table contains a listing of the disk locations and lengths of data records that were requested by the host computer 14 in the immediately previous power-on/reset. Additionally, a copy of a prefetch flag, if enabled by the user, is created and set active at block 28. In other words, the prefetch flag is preferably defined to be active by the user of the hard disk drive 12 to enable the adaptive caching of the present invention. If desired, the default setting of the prefetch flag can be set to active. The original prefetch flag resides on the disk and is settable by the user (setting the features for IDE, and setting the mode pages for SCSI), and the copy of the prefetch flag is what is used for all steps discussed below, except where indicated otherwise.

Next, at block 30, task control blocks (TCBs) are created and initiated in accordance with well-known principles to read the data represented by the prefetch table from the disks 16 into the RAM cache 18. The method then enters an idle state 32 to await a command from the host computer 14.

During the idle state 32, the process can move to decision diamond 33 to determine whether the prefetch table has been stored since the latest power on or reset. Also, it is determined whether the original prefetch flag is active and whether the copy of the flag is inactive. If the original flag is active, the copy is not, and the table has not been stored since the latest power on/reset, (and, if desired, a disk drive idle time has been exceeded), then the process moves to block 33A to store the table onto the area of the disk reserved for the table. From block 33A or from decision diamond 33 if any one of the above-noted conditions have not been met, the logic moves back to the idle state 32.

At block 34, a command is received from the host computer 14, and a task control block (TCB) is accordingly built to support the command. From block 34, the process moves to decision diamond 36 to determine whether the command received from the host computer 14 is a read command.

If the command is a read command, indicating that the host computer 14, pursuant to its initialization, is requesting data records that are part of a computer program such as DOS or Windows, the process moves to decision diamond 38 wherein it is determined whether the prefetch flag is active. If it is, the process continues to block 40, wherein the disk location and length of the record requested by the read command is recorded in the prefetch table for the next power-on/reset. Thus, at block 40 the prefetch table is updated to reflect a newly requested record, or to reflect a new disk location of a previously-requested record. Then, it is determined at decision diamond 42 whether a read miss counter exceeds a predetermined read miss threshold. If so, the prefetch flag is set to inactive at block 44.

The skilled artisan will recognize that the read miss threshold represents a predetermined number of cache misses. Per the present invention, the read miss threshold can be a programmed integer, or it can be an adaptively determined integer. For example, the read miss threshold can be calculated as a predetermined fraction of total cache "hits". Or, the read miss threshold can be calculated as the number of misses beyond which a predetermined percentage of the records requested by the host computer 14 cannot be retrieved from the cache 18.

From block 44, or from decision diamonds 38 or 42 when the decisions there are negative, the process moves to decision diamond 46 to determine whether the requested data exists in cache. If not, a cache read miss counter (initialized at zero) is incremented by one at block 48, and the requested record is transferred from the disks 16 to the host computer 14 using normal processing at block 50. (As the skilled artisan will recognize, a counter can instead by initialized to a predetermined value and then decremented instead of incremented, in which case the test at decision diamond 42 would be changed to "is the read miss counter greater than zero?"). From block 50, or from decision diamond 46 if it was determined that the requested data exists in cache, the process moves to block 52 to transfer the record from cache 18 to the host computer 14.

After the read processing just described, the method proceeds to decision diamond 54 to determine whether the copy of the prefetch flag is active. If it is active, the logic, at block 56, uses the next entry in the prefetch table to build a task control block (TCB) to fetch data into the same segment of the cache 18 that the just-transferred record had occupied prior to being communicated to the host computer 14. In accordance with the present invention, the TCB in block 50 is activated as though a command otherwise was received across the device/file interface. In other words, when the host computer 14 is a PC, the TCB in block 50 is activated as though a command otherwise was received across the SCSI (or IDE)—disk drive interface. In this way, the relatively small amount of cache storage space can be optimally used during the adaptive caching process until all records designated in the prefetch table have been loaded into cache and then transferred to the host computer 14. Also, if desired the process updates the data in the cache 18 of the disk drive 12 in response to the step undertaken at block 56. Stated differently, at block 56 the next entry in the prefetch table is copied from the disks 16 to the data cache 18. The control then loops back to idle state 32.

Thus, the above discussion is directed to the condition wherein a read command is received. Recall that this decision is made at decision diamond 36. In contrast to the steps executed as described above, when it is determined at decision diamond 36 that the command received at block 34 is not a read command, the logic moves to decision diamond 58 to determine whether the command is a write command. If the command is not a write command, the process moves to block 60 to proceed using existing data access and command processing methods, and then the process continues back to the idle state 32.

If, however, the command received at block 34 is a write command, the process moves to decision diamond 62 to determine whether the copy of the prefetch flag is active. If not, the logic loops back to block 60, but otherwise the logic moves to decision diamond 64 to determine whether a write miss counter exceeds a predetermined write miss threshold. If it does, the prefetch flag copy is set to inactive at block 66. Otherwise, the write miss counter is incremented at block 68. From blocks 66 and 68 the process loops back to block 60. If desired, while the disk drive 12 is idle, the data on the disks 16 that was requested by the host computer 14 is reordered on the disks 16 for accessing the data into cache during the next power-on/reset with a minimum of latency and seek times.

The method just described and illustrated in FIG. 3 may be realized in a computer program in, for example, the C++ language, when commonly known programming techniques are employed with reference to the pseudo code representation in Table I.

TABLE I

A high-level pseudo-code representation of a computer program embodying the invention
for a hard disk drive sequence after power-on through the first X number of READ commands from
a host computer.
1) disk drive diagnostics successfully complete
2) all drive cache segments are filled with data that was requested from the previous
   power-on
      the power-on prefetch table is read from the reserved area on the disk into
      SRAM
      a series of tasks are initiated, by creating task control blocks (TCB) and
      starting them much like they would normally be started upon command
      receipt, to read the data the power-on prefetch table points to into data buffer
      RAM.
3) drive goes into its idle loop
4) command is received from host
5) a TCB is built to handle command
6) is the command a read?
   Y) is the prefetch flag active?
      Y) store the location and length of the requested record for the
         subsequent power-on or reset cycle.
         cache read miss threshold exceeded?
            Y) set prefetch flag inactive
         data in cache?
         N) increment cache read miss count
      normal read processing, set up hardware and start transfer, disk to
      cache
      prefetch flag active?
         Y) when transfer complete, use next entry in prefetch tabte to build TCB
            to fetch data into same segment as last transfer. TCB is activated as
            if a command was received across the interface.
   N) is the command a write?
      Y) Prefetch flag active?
         Y) write threshold count exceeded?
            Y) set prefetch flag inactive
            N) increment write threshld count
      proceed using existing data access and command processing methods
7) whenever command is received from host, go to (3).
8) during idle time the revised table is stored onto the reserve area of the disk (only
   done once per power on/reset session).

Note <a>: The file side code (software that works very close to the disk side of the hardware, as
opposed to the IDE/SCST or host side of the hardware) operates quasi-independently from host side
code (it is linked together through TCBs and other global variables). The hardware can support con-
current host and file side operations.

While the particular METHOD FOR MINIMIZING A COMPUTER'S INITIAL PROGRAM LOAD TIME AFTER A SYSTEM RESET OR A POWER-ON USING NON-VOLATILE STORAGE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer program product for use with a peripheral storage apparatus including at least one data storage element and a data cache, comprising:
   a computer program storage medium readable by a digital processing apparatus; and
   a program means on the program storage medium and including instructions executable by the digital processing apparatus for causing the digital processing apparatus to copy data stored on the data storage element to the data cache by:
      after an initial power-up or reset of the peripheral storage apparatus and a host computer associated with the peripheral storage apparatus, receiving a read command from the host computer for transferring to the host computer a data record of a program stored on the data storage element;
      in response to receiving, generating and storing in the peripheral storage apparatus a prefetch table representative of a storage location and length of the data record requested by the initial read command;
      after a subsequent power-on or reset of the peripheral storage apparatus, and during a second power-on or reset of the host computer, accessing by the peripheral storage apparatus the prefetch table to read the data record into the data cache; and
      in response to subsequent read commands from the host computer, determining whether records requested by the subsequent read commands are stored in the data cache, and if so, communicating the records from the data cache to the host computer, and otherwise communicating the records from the data storage element to the host computer.

2. The computer program product of claim 1, wherein accessing and determining are repeated for each power-on or reset of the host computer, the program means further causing the digital processing apparatus to:
   increment a read counter when it is determined that records requested by the subsequent read command are not stored in the data cache.

3. The computer program product of claim 1, wherein the program means further causes the digital processing apparatus to update the data prefetch table.

4. The computer program product of claim 1, in combination with the storage apparatus.

5. The computer program product of claim 2, wherein the program means further causes the digital processing apparatus to:

communicate the records from the data storage element to the host computer when the read counter exceeds a predetermined threshold; and set a prefetch flag to inactive when the read counter exceeds the predetermined threshold.

6. The combination of claim 4, in further combination with the host computer.

7. The computer program product of claim 4, wherein the storage apparatus is a disk drive.

8. The computer program product of claim 5, wherein the program means further causes the digital processing apparatus to set the prefetch flag to inactive when a predetermined number of write commands from the host computer to the peripheral storage apparatus have been received.

9. The computer program product of claim 5, wherein the program means further causes the digital processing apparatus to:

after communicating, when the prefetch flag is inactive, determine whether the peripheral storage apparatus is idle and if so, store the prefetch table on the data storage element.

10. The computer program product of claim 7, wherein the data storage element is a disk.

11. A computer program product for use with a host computer coupled to a peripheral storage apparatus including at least one data storage element having a program stored thereon and a data cache, comprising:

a data storage device for use within a peripheral storage apparatus, the data storage device including a computer usable medium having computer readable program means for loading the program from the peripheral storage apparatus to the host computer during power-on or reset of the host computer, comprising:

computer readable code means for receiving a command from the host computer during a power-up or reset of the host computer;

computer readable code means for, when the command is a read command, generating and storing in the peripheral storage apparatus a prefetch table representative of at least a storage location of the records requested by the read command for transfer of the records from the data storage element to the data cache for a subsequent power-on or reset of the host computer;

computer readable code means for determining whether the records have been stored in the data cache in response to a previous power-on or reset of the host computer; and computer readable code means for communicating the records to the host computer in response to the code means for determining.

12. The computer program product of claim 11, wherein the code means for communicating transfers the records from the cache if the records are in the cache, and otherwise from the data storage element.

13. The computer program product of claim 12, wherein the length of the records is recorded in the prefetch table, and the computer program product further comprises:

computer readable code means for updating the prefetch table when a record or the storage location of a record requested during a subsequent power-on or reset of the host computer is different from the storage location or record represented in the prefetch table.

14. The computer program product of claim 13, further comprising:

computer readable code means for incrementing a read counter when records requested by the read command are not stored in the cache;

computer readable code means for communicating the records from the data storage element to the host computer when the read counter exceeds a predetermined threshold;

computer readable code means for setting a prefetch flag to inactive when the read counter exceeds the predetermined threshold; and computer readable code means for setting the prefetch flag to inactive when a predetermined number of write commands from the host computer to the peripheral storage apparatus have been received.

15. The computer program product of claim 14, further comprising computer readable code means for, after the communicating step and when the prefetch flag is inactive, determining whether the peripheral storage apparatus is idle and if so, storing the prefetch table on the data storage element.

16. The computer program product of claim 15, in combination with the peripheral storage apparatus.

17. The computer program product of claim 16, wherein the peripheral storage apparatus is a disk drive.

18. The combination of claim 16, in further combination with the host computer.

19. The computer program product of claim 17, wherein the data storage element is a disk.

20. A method for causing a computer program stored in a data storage element in a peripheral storage apparatus of a computer system to be loaded to a host computer, the method comprising the steps of:

after power-up or reset, receiving a read command from the host computer for transferring a data record of a computer program stored on the data storage element to the host computer;

in response to receiving, generating and storing in the peripheral storage apparatus a prefetch table representative of a storage location and length of the data record requested by the initial read command;

after a subsequent power-on or reset of the peripheral storage apparatus, and during a second power-on or reset of the host computer, accessing by the peripheral storage apparatus the prefetch table to read the data record into the data cache; and in response to subsequent read commands from the host computer, determining whether records requested by the subsequent read commands are stored in the data cache, and if so, communicating the records from the data cache to the host computer, and otherwise communicating the records from the data storage element to the host computer.

21. The method of claim 20, wherein the accessing and determining steps are repeated for each power-on or reset of the host computer, and the method steps further comprise:

incrementing a read counter when it is determined during the determining step that records requested by the subsequent read command are not stored in the data cache.

22. The method of claim 20, wherein the method steps further include updating the data prefetch table.

23. The method of claim 21, wherein the method steps further comprise:

communicating the records from the data storage element to the host computer when the read counter exceeds a predetermined threshold; and setting a prefetch flag to inactive when the read counter exceeds the predetermined threshold.

24. The method of claim 23, wherein the method steps further comprise setting the prefetch flag to inactive when a predetermined number of write commands from the host computer to the peripheral storage apparatus have been received.

25. The method of claim 23, wherein the method steps further comprise:

after the communicating step, when the prefetch flag is inactive, determining whether the peripheral storage apparatus is idle and if so, storing the prefetch table on the data storage element.

26. The method of claim 23, wherein the peripheral storage apparatus is a disk drive.

27. The method of claim 26, wherein the data storage element is a disk.

28. A disk drive, comprising:

one or more read heads for reading from one or more disks of the disk drive;

a data cache comprising a random access memory (RAM);

a controller;

the controller being operative to execute the following steps after a power-up or reset of the disk drive and a host computer associated with the disk drive:

receiving, from the host computer, a read command which requests data records of an application program stored on the one or more disks;

generating and storing a prefetch table in the disk drive in response to receiving the read command, the prefetch table representing disk storage location and length of the data records requested by the read command;

the controller being operative to execute the following steps for subsequent power-up or resets of the disk drive and host computer:

receiving, from the host computer, a subsequent read command which requests data records stored on the one or more disks;

prior to receiving the subsequent read command, identifying and locating the data records of the application program on the one or more disks based on the disk storage location and length represented in the prefetch table;

prior to receiving the subsequent read command, and upon identifying and locating the data records, reading the data records of the application program from the one or more disks and storing them in the data cache; and in response to receiving the subsequent read command, communicating the prestored data records of the application program from the data cache to the host computer if the subsequent read command requests those data records, and otherwise accessing data records from the one or more disks for communicating.

29. The disk drive according to claim 28, wherein the one or more disks comprise one or more hard disks and the disk drive comprises a hard drive.

30. The disk drive according to claim 28, wherein the controller is further operative to execute the following steps for subsequent power-up or resets of the disk drive and host computer:

determining whether the subsequent read command requests the prestored data records in the data cache; and updating the prefetch table with disk storage location and length corresponding to those data records being requested by the subsequent read command when those data records are not the same as the prestored data records in the data cache.

31. The disk drive according to claim 28, wherein the one or more disks comprise one or more hard disks and the disk drive comprises a hard drive, and wherein the controller is further operative to execute the following steps for subsequent power-up or resets of the disk drive and host computer:

determining whether the subsequent read command requests the prestored data records in the data cache; and updating the prefetch table with disk storage location and length corresponding to those data records being requested by the subsequent read command when those data records are not the same as the prestored data records in the data cache.

32. A method for reducing an initial program load time with use of a hard drive, the method comprising:

after a power-up or reset of the hard drive and a host computer associated therewith, the following steps being performed by and at the hard drive:

receiving, from the host computer, a read command which requests data records of an application program stored on one or more hard disks of the hard drive;

generating and storing a prefetch table in response to receiving the read command, the prefetch table representing disk storage location and length of the data records requested by the read command;

for subsequent power-up or resets of the hard drive and host computer, the following steps being performed by and at the hard drive:

receiving, from the host computer, a subsequent read command which requests data records stored on the one or more hard disks;

prior to receiving the subsequent read command, identifying and locating the data records of the application program on the one or more hard disks based on the disk storage location and length represented in the prefetch table;

prior to receiving the subsequent read command, and upon identifying and locating the data records, reading the data records of the application program from the one or more hard disks and storing them in a data cache in the hard drive; and in response to receiving the subsequent read command, communicating the prestored data records of the application program from the data cache if the subsequent read command requests those data records, and otherwise accessing data records from the one or more hard disks for communicating.

33. The method according to claim 32, further comprising for the subsequent power-up or resets of the hard drive and host computer:

determining whether the subsequent read command requests the prestored data records in the data cache; and updating the prefetch table with disk storage location and length of those data records being requested by the subsequent read command when those data records are not the same as the prestored data records in the data cache.

* * * * *